United States Patent [19]
[11] 3,953,559
Weber et al.
[45] Apr. 27, 1976

[54] REVERSE COATING PROCESS USING A LACTAM RELEASE AGENT

[75] Inventors: Karl-Arnold Weber; Kuno Wagner; Siegfried Klipfel, all of Leverkusen, Germany

[73] Assignee: Bayer Aktiengesellschaft, Leverkusen, Germany

[22] Filed: May 3, 1974

[21] Appl. No.: 466,755

[30] Foreign Application Priority Data

May 19, 1973 Germany .......... 2325577

[52] U.S. Cl. .......... 264/39; 106/38.22; 264/74; 264/213; 264/338

[51] Int. Cl.$^2$ .......... B29D 7/02; B29C 1/04

[58] Field of Search .......... 264/213, 338, 74, 78, 264/39, 255; 427/133, 135; 106/38.22

[56] References Cited

UNITED STATES PATENTS

| | | | |
|---|---|---|---|
| 2,566,982 | 9/1951 | Clemens et al. | 264/213 |
| 3,277,227 | 10/1966 | Kesseler | 264/213 |
| 3,413,390 | 11/1968 | Heiss | 264/213 |
| 3,694,530 | 9/1972 | Wolfe | 264/338 |

*Primary Examiner*—Donald J. Arnold
*Assistant Examiner*—James B. Lowe
*Attorney, Agent, or Firm*—Lawrence S. Pope; Gene Harsh

[57] ABSTRACT

A substrate to be used as a support for a release coating is provided with a powdery release support with a release agent which is substantially non-tacky by applying on the support an aqueous solution, dispersion or paste containing a lactam compound which is water soluble, swells in water or forms a paste with water, drying the resulting coating. The process comprises treating the release agent, drying the release agent, applying a polyurethane coating over the release support and then removing the polyurethane coating from the release support. The release agent is selected from lactams and addition compounds of lactams with water, oximes, amines, monofunctional or polyfunctional alcohol or thioalcohols and mixture thereof.

9 Claims, No Drawings

REVERSE COATING PROCESS USING A LACTAM RELEASE AGENT

REVERSE COATING PROCESS

This invention relates generally to polyurethane coatings and more particularly to an improved method for reverse coating a substrate with a polyurethane resin coating.

The coating and laminating of sheet structures may be carried out by doctor knife coating either by direct coating or by reverse coating. Release supports are used in industry for reverse coating. These supports are usually special papers or woven or knitted fabrics or the like which are covered with a release layer on one or both sides before the release coating is applied. In order to be acceptable as a release coating, the material selected must permit substantially uniform distribution of the coating compound (by spreading) over the substrate. Moreover, the release coating must adhere uniformly over the width and length of the release support to avoid premature separation from the substrate but not so firmly that it cannot be removed when desired without damage thereto.

With some coatings, release supports have been used without a release layer. Such supports are mainly steel bands of the kind used, e.g., in the coating industry for reverse coating a substrate with PVC. However, a release agent is usually used on the supports to facilitate separating of a release coating therefrom. Such release agents are usually a silicone, wax or epoxide.

Repeated reverse coating with polyurethane systems on steel bands is possible if the steel band is treated between each coating with a sufficient amount of a substance such as a silicone during the operation. Unfortunately, however, when the film is separated from the support, some of the silicone is removed with it from the steel band.

When the surface of the polyurethane coating has a silicone thereon, the subsequent printing or the application of a finish on the polyurethane becomes extremely difficult or even impossible.

Also, since quantitative removal of the silicone from the steel band is difficult to achieve in practice, the silicone remaining on the band causes a problem when there is a change-over of production from a polyurethane to another material such as polyvinyl chloride because the silicone affects the release properties and the surface properties of the PVC for an indefinite period in a manner which cannot be controlled.

It is therefore an object of this invention to provide a means for making reverse polyurethane coatings on steel band coating equipment which does not cause problems when the equipment is used for coating with other materials. Another object of the invention is to provide a method for producing reverse coatings with polyurethane systems which can be used in steel band reverse coating installations which are to be used for producing a plurality of different kinds of release coatings. Still another object of the invention is to provide a new release agent for use in preparing release coatings with polyurethane systems. A more specific object of the invention is to provide a release agent for release coating processes which does not interfere with the uniform coating of the substrate, permits the release coating to adhere to the substrate sufficiently to avoid inadvertent detachment therefrom but not so firmly that the coating is damaged when removed intentionally from the substrate and which does not interfere with subsequent printing or finishing of the release coating.

The foregoing objects and others are accomplished in accordance with this invention, generally speaking, by providing release agents for use in release coating processes which are water soluble or swell or form a paste with water and which after application to a substrate (either in pure form or associated with water) and drying form a powder but no film, said powder being substantially free from tackiness at the temperatures customarily employed (i.e., up to about 40°C) during the separation of the release coating from its support.

It has now surprisingly been found that numerous products with differing chemical compositions have these characteristics and can be used as release agents. It has also been found that by mixing compounds of this type together it is possible to provide a release agent particularly well suited for use with a specific polyurethane system. None of the contemplated compounds, surprisingly, are substances which have previously been regarded as release agents in the normal sense, for example, they are not silicones, waxes or the like.

This invention therefore provides a process for reverse coating sheet structures with a polyurethane by treating a release support with a release agent, applying the polyurethane coating compound over the release agent on the substrate, drying or curing the coating and then removing the hardened material from the release support, characterized in that the release agent is a compound or mixture of compounds which will dissolve or swell in water or will form a paste with water and which crystallizes on drying without film-forming and is free from tackiness at temperatures of up to 40°C.

Release agents which are particularly suitable according to the invention are lactam adducts of the kind described in German Offenlegungsschrift Nos. 2,062,288 and 2,062,289 (corresponding to copending U.S. applications Ser. No. 415,892 and Ser. No. 207,560, now U.S. Pat. No. 3,867,373). These compounds can easily be prepared from lactams of the general formula

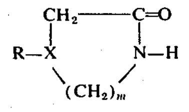

wherein

X represents either a CH group, in which case
R represent hydrogen and
*m* is an integer of between 0 and 9, or
X represents a nitrogen atom, in which case
R represents an aliphatic group, an araliphatic group, or a pyridine group which may be substituted by lower alkyl groups, and
*m* represent the integer 3, and water, an oxime, amine or any alcohol and/or thioalcohol. The preferred lactams are ε-caprolactam, 1-N-methylhexahydro-1,4-diazepinone-(3), butyrolactam, valerolactam and dodecalactam.

The following compounds are given as examples for (thio) alcohols, amines and oximes which may be used to form adducts with the aforesaid lactams:

Methanol, ethanol, propanol, n-butanol, tert.-butanol, ethylene glycol monomethylether, benzyl alcohol, furfuryl alcohol, n-butyl mercaptane, dodecyl mercaptane, mercapto ethanol, phenol, thiophenyl, β-hydroxy benzaldehyde, ethylene glycol, diethylene glycol, thiodiglycol, propane diol, trimethylol propane, hexane diol, N-methyl diethanol amine, resorcinol, ethanolamine, N-methylol derivatives of valerolactam and butyrolactam, N-methyl ethanolamine, n-propyl amine, n-butyl amine, dibutylamine, stearylamine, N-methyl stearyl amine and the oximes of acetone, methyl ethylketone, cyclohexanone, butyraldehyde and benzaldehyde.

The quantity of water or oxime, amine or monofunctional or polyfunctional alcohol or thioalcohol used is 0.3 to 4 equivalents preferably 1 to 3 equivalents, per mol of lactam and/or azalactam.

Adducts of 1 mol of ε-caprolactam and 1 mol of methanol, 1 mol of ε-caprolactam and 1 mol of ethanol as well as 1 mol of ε-caprolactam and 1 to 2 mols of water, ethylene glycol or diethylene glycol are particularly suitable. Addition compounds of butyrolactam and valerolactam with the abovementioned hydroxyl compounds or water may equally well be used according to the invention. Mixtures of the above compounds can of course also be used.

All these lactam adducts which are initially low viscosity liquids can easily be converted into a highly crystallized lactam by the supply of small quantities of heat (approximately 1 to 2 Kcal/mol) with removal of the volatile adduct forming agent.

According to the invention, caprolactam itself or its homologues such as butyrolactam or valerolactam can also be used as release agents. The following are other examples of compounds which all have the properties mentioned above: urea and substituted ureas, thiourea, cane sugar and other types of sugar, alginates, cellulose ethers and esters, methylene diurea, methylene thiourea, acetamide, propionic acid amide, formanilide, bis-formylated 4,4′-diaminodiphenylmethane, diacetylurea, diacetylthiourea, dicyandiamide, hexamethylene diurea, bis-methoxymethyl-urea, bis-methoxymethylthiourea, melamine, trimethyolmelamine, methylolated dicyandiamide, ethylurethane, adipic acid dihydrazide, powdered bis-urethanes which are obtained by reacting bis-chloroformic acid esters of diols such as butane-1,4-diol and hexane-1,6-diol with ammonia, hydrazodicarbonamide, biuret, crystallizing alcohols such as pentaerythritol, trimethylolpropane, sorbitol, etc., glycol carbonate, hydroxyurethanes of glycol carbonate and ammonia, diamines or polyamines and the like.

Inorganic salts such as alkali metal and alkaline earth metal halides or sulphates in the form of their aqueous solutions or aqueous pastes may also be used as release agents according to the invention.

According to the invention, however, it is preferred to use those crystallizing or solidifying non-tacky release agents which have a melting point or decomposition point below about 220°C, preferably between about 40° and about 140°C and are readily soluble or capable of swelling in water and the molecular structure of which contains groups which have a tendency to association such as a cyclic amide group, an unsubstituted or monosubstituted amide group, a urea group and/or thiourea group, an unsubstituted urethane group, a monosubstituted urethane group, an optionally substituted biuret group, an optionally substituted hydrazodicarbonamide group or a triazine group which contains amino groups as in melamine or substituted melamines, or dicyandiamide, or methylolated or alkoxymethylated derivatives of any of these compounds as well as substances which contain sulphonamide groups or substituted sulphonamide groups in the molecule and/or contain at least 3 hydroxyl groups. Higher molecular weight water-soluble polysaccharides, polyvinyl alcohol, higher molecular weight cellulose ethers, dextrin and starches which are soluble in water or capable of swelling in water may also be used. The release action of these products is not restricted to steel bands but is also effective with other conventional release supports such as paper or the like.

In the process according to the invention the support may be coated with the pure release agents (e.g., in case of lactam adducts), their aqueous solutions or aqueous pastes by spraying, casting, knife coating, brushing, etc. The release agent spread on the surface of the support is then heat treated for about 5 seconds to 10 minutes at about 30° to 150°C, preferably 40° to 120°C, to form a dry, tack-free coating.

As stated hereinbefore, among all of the named compounds, the lactam addition products are especially suitable for use in the process according to the invention. This is not only due to their particularly good release effect but also to a number of very advantageous side effects.

It was surprisingly found that the above-defined lactam addition compounds have an excellent cleaning effect on the steel band and also on other surfaces. All kinds of impurities which usually settle on the steel band during the continuous coating process (coating remains, fluff, dust, etc.) are removed after a short time when using the process according to the invention. The same also applies in the case of release cloths or release paper. After three to five times of using in polyurethane coating with prior art release agents, a paper substrate is normally no longer usable because the release properties no longer function reliably.

In the process of the invention paper substrates can be used many more times when lactam adducts are employed as release agents. It is even possible to regenerate release paper which has been used with prior art release agents and whose release effect is no longer adequate after use a number of times in conventional coating processes by using a release agent containing a lactam adduct.

A particular advantage when using lactam addition products as release agents is the completely novel, very aesthetic color effects which can be achieved surprisingly if the adducts are admixed with dyestuffs prior to their use. It was observed that the dyestuffs penetrate into the surface of the coating and hence display excellent adherence. It is possible to achieve a greater or lesser coloring effect depending on the thickness of the release agent layer applied. A particularly attractive irregular design is formed if the release agent mixed with the dyestuff is non-uniformly distributed over the steel band, e.g., by wiping it over the band with the hand or by means of brush rollers rotatable in opposite directions. It is, of course, likewise possible to apply differently dyed release agents, or dyed and undyed or weakly dyed release agents next to each other onto the steel band by applying it by spraying, dropping, pouring, brushing, doctor coating, casting, by kiss roller application or by other mechanical operations thus producing the desired color effects.

Many different kinds of products may be used as dyestuffs in this particularly preferred embodiment of the invention. Any suitable inorganic or organic dye pigment as well as the usual soluble dyestuffs, e.g., basic, acid, metal complex dyestuffs and direct dyestuffs may be used in the process provided by the invention.

Any suitable polyurethane system may be used for reverse coating in accordance with the invention. The release action of the newly found release agents is effective both in the case of single component and two-component solutions and in the case of solvent-free reactive systems, but polyurethane powders, suspensions or dispersions may equally well be used as coating materials.

The following Examples serve to explain the invention without restricting it. The parts given in the examples are parts by weight unless otherwise indicated.

EXAMPLE 1

A surface ground steel band is coated with 10 g/m$^2$ of the adduct of ethylene glycol and $\epsilon$-caprolactam (molar ratio 1:1) and dried at 50°C. A polyurethane powder with a melting point of 165°C which has been prepared by the prepolymer process from 100 parts of a polyester from adipic acid and butanediol (molecular weight 2250; acid number 0.7), 35 parts of 4,4'-diphenylmethane-diisocyanate and 9 parts of butane-1,4-diol (NCO:OH = 1:1) is applied to this pretreated steel band by doctor coating.

The powder is indirectly heated to 170°C and sintered to form a film. The film can easily be removed from the steel band after cooling.

The experiment can be carried out in analogous manner and equally successfully with adducts of $\epsilon$-caprolactam and methanol or diethylene glycol (molar ratio 1:1).

The adduct of ethylene glycol and $\epsilon$-caprolactam has the advantage of not only an excellent release effect but also a powerful cleaning effect on the steel band.

EXAMPLE 2

Work is carried out as in Example 1 except that the adduct of $H_2O$ and $\epsilon$-caprolactam (molar ratio 1:1) is used as the release agent. The film can again easily be removed from the steel band.

COMPARISON EXAMPLE

The steel band is coated in accordance with Examples 1 and 2 with the polyurethane powder coating but without pretreatment with a release agent provided by the invention.

The finished film cannot be removed from the metal sheet by mechanical means without being destroyed.

EXAMPLE 3

A steel sheet is coated with a 5% aqueous alginate thickener and dried at 120°C. A polyurethane powder is then applied by doctor coating and melted on the sheet to form a film. The film can be completely separated from the steel sheet after cooling. The surface of the film can be easily finished, printed, etc.

The polyurethane powder used in this example was prepared as follows:

1008 g of a polyester from adipic acid, neopentyl glycol and hexane diol (MW = 1900) are dehydrated at 120°C/15 mmHg. 151 g of hexamethylene diisocyanate are added at 106°C and the temperature is then kept at 100°C for 1 hour and left to fall to 60°C in the course of another hour. 8 g of N-methyldiethanolamine dissolved in 75 g of acetone are then added. The temperature is then kept at 60°C for about 3 hours and the solution is thereafter diluted with a further 200 g of acetone. On the following day, the solution is heated to 55°C and quaternized by the addition of 6.2 ml of dimethylsulphate dissolved in 842 g of acetone.

2292 g of an approximately 50% solution of a weakly cationic prepolymer are obtained (1.06% by weight of NCO).

The prepolymer solution and a normal aqueous ethylene diamine solution (NH/NCO = 0.87) are stirred together. A polyurethane-polyurea powder having a melting point of 164°–170°C is obtained.

COMPARISON EXAMPLE

The sheet used in Example 3 is coated with the same powder coating as before but without application of the alginate layer. The finished film cannot be removed from the metal sheet by mechanical means without being destroyed.

EXAMPLE 4

Example 3 is repeated with aqueous solutions of a series of other release agents and qualitatively similar results were obtained. The release substances used are listed in decreasing order of their releasing effectiveness: dimethylacetamide; bis-urethane obtained from the bis-chloroformic acid ester of butane-1,4-diol and ammonia; sodium chloride; sorbitol, methylthiourea; trimethylolpropane, adipic acid dihydrazide, $BaSO_4$; methylcellulose; propionamide; dimethylurea; phenylguaiazole; $Na_2SO_4$; sucrose.

EXAMPLE 5

Examples 3 and 4 are repeated with the following coating materials, similar results being obtained:

a. 40% aqueous anionic polyurethane dispersion from 82 parts by weight of hexanediol/neopentyl glycol/adipic acid polyester (MW = 1700), 15 parts by weight of hexamethylenediisocyanate, 2 parts by weight of sodium ethylene diaminoethane sulphonate and 1 part by weight of ethylenediamine.
b. Aqueous suspension of polyurethane powder from Example 3.
c. 25% solution of the polyurethane from Example 1 in DMF/Butanone (3:2).
d. 25% solution in DMF/butanone (3:2) of a polyurethane analogous to Example 1 from adipic acid/butanediol polyester (MW = 2250), hexanediol polycarbonate (MW = 2000), butane-diol, 4,4'-diphenylmethane diisocyanate (prepared by the one-shot process, NCO/OH = 1.2).
e. Two component system (30% dissolved in ethyl acetate) consisting of an OH prepolymer from 82 parts of hexanediol/adipic acid polyester (molecular weight 2000) and 18 parts of tolylene diisocyanate (molecular weight approx. 25,000) and the reaction product of 15 parts of trimethylolpropane, 6 parts of butanediol and 79 parts of tolylene diisocyanate as well as 1 part of the adduct of ethylene glycol and $\epsilon$-caprolactam (1:1) as an accelerator.
f. Two component system analogous to (e), half the amount of the polyester in the OH prepolymer being replaced by adipic acid/diethylene glycol polyester (molecular weight 2000).

In cases (a)–(f), the coating composition was applied at room temperature and then heated to about 100°C to form a homogenous film.

EXAMPLE 6

A cartridge paper is coated with a thin layer of a mixture of 1000 g of 5% aqueous alginate thickener, 100 g of urea and 20 g of glycerol which is then dried for some minutes at 120°C and coated in the usual manner with the solution of a thermoplastic polyurethane (Example 5, (c) and (d)). The resulting film can easily be removed from the cartridge paper after evaporation of the solvent and cooling. In a control experiment in which the release support is not pretreated, the cartridge paper and film can be separated only by destroying the paper.

EXAMPLE 7

The steel band is coated with the adduct of ethanol and ε-caprolactam (molar ratio 1:1), heat treated for 10 seconds at 60°C and then coated with an alginate-thickened paste of a 40% aqueous, anionic polyurethane dispersion in accordance with Example 5(a). The finished coating can be completely removed without damage from the steel band.

EXAMPLE 8

The steel band is treated as in Example 7 with the adduct of diethanol amine and ε-caprolactam (2:1) and coated with an aqueous alginate-thickened suspension of a polyurethane in accordance with Example 2.

The coating can be completely removed from the steel band.

EXAMPLE 9

The steel band is treated with the adduct of diethylene glycol and ε-caprolactam (2:1) and coated with the 25% solution of polyurethane from Example 1 in DMF/butanone (3:2).

The finished film can be removed without difficulty.

EXAMPLE 10

The steel band is treated with the adduct ethylene glycol/ε-caprolactam (molar ratio 1:1) and coated with each of the following polyurethane systems. Coating is carried out at room temperature and the band then heated up to about 100°C for the film to form. The solvent is removed by means of an air current.

In all cases the coating can be completely removed from the band.

a. A 25% solution in DMF/butanone (3:2) of a polyurethane in accordance with Example 5d).

b. Two component system (30% dissolved in ethylacetate) in accordance with Example (5e) containing 2% by weight of the adduct of ε-caprolactam and ethylene glycol (molar ratio 1:1).

c. Two component system analogous to (b) using adipic acid diethylene glycol polyester in the preparation of the OH prepolymer.

d. Reactive mixture from:

100 parts of a polyester from adipic acid and diethylene glycol having a molecular weight of 2000, 30 parts of an isomer mixture of diisocyanates whose main part is diphenyl methane-4,4'-diisocyanate which was obtained by phosgenation of the technical amine mixture as it forms during the aniline-formaldehyde condensation.

2 parts of the adduct of ε-caprolactam and ethylene glycol (molar ratio 1:1).

EXAMPLES 11–16

The Examples 1, 2 as well as 7 to 10 were repeated with the difference that release papers were used as the release supports which are resistant to wet processing and solvents, for example URECAST paper (FEIKES, Stripcote, etc.)

The coatings can be completely removed from the release paper. It is irrelevant whether the paper is brandnew or has been used several times and can no longer be employed in conventional coating processes due to an inadequate release effect. Such paper can be regenerated a number of times and re-used if treated with the ε-caprolactam adducts.

EXAMPLE 17

The steel band is treated with the adduct ε-caprolactam/ethylene glycol (molar ratio 1:1) into which 5 to 10 parts of one of the following pigment dyestuffs had previously been stirred color index pigment blue 15, 7416 color index pigment orange 43, 71 105

The colored preparation is wiped onto the band to form a pattern and subjected to heat treatment at about 40°C for 1 minute. Thereafter, it is coated with the polyurethane solution from Example 9. The dyestuff then penetrates into the coating, is removed together with it from the band and remains fixed, both in the wet or dry condition within the surface of the finished film so as to be fast to rubbing.

EXAMPLE 18

Example 17 is repeated on release paper with the same result.

EXAMPLE 19

Work is carried out analogously to Examples 17 and 18 with the difference that the following soluble dyestuffs are used instead of the dye pigments. Similar color effects are achieved as in Example 17.

C.I. Acid Yellow 9, 13 015

C.I. Acid Red 18, 16 255

C.I. Acid Blue 104, 42 735

C.I. Basic Red 77

C.I. Basic Violet 16, 48 013

C.I. Basic Violet 14, 46 510

C.I. Basic Violet 2, 42 510

C.I. Basic Yellow 2, 41 000

C.I. Basic Blue 76

C.I. Acid Red 81, 68 200

C.I. Acid Yellow 49

C.I. Direct Red 46, 23 050

C.I. Direct Yellow 12, 24 895

C.I. Direct Blue 1, 24 410

C.I. Acid Blue 199

Any of the other release agents disclosed as suitable herein can be substituted for those used in the foregoing examples.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a process for reverse coating a substrate with a polyurethane which comprises treating a release support with a release agent, drying the release agent to form a dry tack-free coating, applying a polyurethane coating over the release agent, and then removing the coating from the release support, the improvement which comprises treating the said support with a release agent which is soluble in water, swells in water or forms a paste with water and which crystallizes when dried without forming a film and is free from tackiness at temperatures of up to 40°C and is selected from the group consisting of lactams and addition compounds of lactams with water, oximes, amines, monofunctional or polyfunctional alcohol or thioalcohols and mixtures thereof.

2. The process of claim 1 wherein a dyestuff is dissolved or a dye pigment is distributed in the release agent.

3. The process of claim 2 wherein the dyed release agent is applied by means of nozzles, brushes, doctor blades, casting devices or by other mechanical operations to the release support in an even layer or as a pattern.

4. The process of claim 1 wherein the release support is a steel band, release cloth or embossed or smooth release paper.

5. The process of claim 1 wherein the lactam has the formula

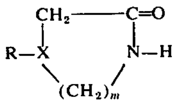

wherein

X represents either a CH group, in which case

R represents hydrogen and

*m* is an integer of between 0 and 9, or

X represents a nitrogen atom, in which case

R represents an aliphatic group, an araliphatic group or a pyridine group which may be substituted by lower alkyl groups, and

*m* represents the integer 3.

6. The process of claim 5 wherein the said compound is ε-caprolactam.

7. The process of claim 5 wherein the release agent is an adduct of ε-caprolactam and water or an alcohol.

8. In a process for reverse coating a substrate with a polyurethane which comprises spreading a liquid containing the release agent on the surface of a release support, heat treating the release agent to form a dry tack-free coating, applying a polyurethane coating over the release agent and then removing the coating from the release support, the improvement wherein the release agent is soluble in water, swells in water or forms a paste with water and which crystallizes when dried without forming a film and is free from tackiness at temperatures of up to 40°C and is a lactam or addition compound of a lactam with water, an oxime, amine or monofunctional or polyfunctional alcohol or thioalcohol or a mixture thereof.

9. In a process for reverse coating a substrate with a polyurethane which comprises covering the surface of a release support with liquid release agent, an aqueous solution of a release agent or an aqueous paste of the release agent, heat treating the release agent from about 5 seconds to 10 minutes at 30° to 150°to form a dry tack-free coating, applying a polyurethane coating over the release agent and then removing the coating from the release support, the improvement wherein the release agent is soluble in water, swells in water or forms a paste with water, crystallizes when dried without forming a film, is free from tackiness at temperatures up to 40°C and which is a lactam of the formula

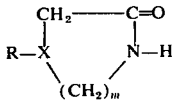

wherein

X represents either a CH group in which case

R represents hydrogen and

*m* is an integer of between 0 and 9, or

X represents a nitrogen atom, in which case

R represents an aliphatic group, an araliphatic group or a pyridine group which may be substituted by lower alkyl groups, and m represents the integer 3 or the addition compound of said lactam with a reactant selected from the group consisting of water, an oxime, an amine, alcohol and thioalcohol.

* * * * *